219-121.    SR
OR    3,576,965

[11] 3,576,965

[72] Inventor Gottfried Gugger
    Steffisburg, Switzerland
[21] Appl. No. 759,664
[22] Filed Sept. 13, 1968
[45] Patented May 4, 1971
[73] Assignee Laser Technique SA.
    Bern, Switzerland
[32] Priority Sept. 25, 1967
[33] Switzerland
[31] 13357/67

[54] METHOD AND DEVICE FOR BORING WORKPIECES, PARTICULARLY WATCH JEWELS BY MEANS OF LASER PULSES
26 Claims, 3 Drawing Figs.

[52] U.S. Cl. ............................................. 219/121
[51] Int. Cl. ............................................. B23k 9/00
[50] Field of Search ........................................ 219/121,
    121 (EB), 121 (Lasers); 356/170

[56] References Cited
    UNITED STATES PATENTS
3,308,263  3/1967  Schleich ........................ 219/121
3,410,979  11/1968  Larsson ........................ 219/121
3,422,246  1/1969  Wetzel .......................... 219/121
    FOREIGN PATENTS
684,435  12/1952  Great Britain .................. 356/170
    OTHER REFERENCES
I.B.M. Tech. Disclosure Bulletin; Vol. 8 No. 6/11/65, 219/121 Laser

*Primary Examiner*—J. V. Truhe
*Assistant Examiner*—R. Skudy
*Attorney*—Imirie & Smiley ABSTRACT: A method and device for producing bores of substantially circular cross section in workpieces, particularly in watch jewels, by means of laser pulses, wherein a number of laser pulses successively produced by a laser source are directed into an optical deflecting system wherein the laser beam is deflected from its axis of incidence, successive laser pulses being thereby distributed by said rotating deflecting system on a path round the axis of the bore to be produced.

INVENTOR
GOTTFRIED GUGGER

INVENTOR
GOTTFRIED GUGGER

METHOD AND DEVICE FOR BORING WORKPIECES, PARTICULARLY WATCH JEWELS BY MEANS OF LASER PULSES

It is generally known, that materials and workpieces which are difficult to machine, for instance watch jewels, may be bored by means of laser pulses. In spite of substantial efforts and research in this field no boring method could be developed in the past allowing boring of big lots of workpieces, particularly watch jewels, with the required reproducibility and without damaging jewels.

For commercial reasons, particularly in view of the lifetime of the flashtube for stimulating solid-state lasers, there was a general tendency to produce each bore by means of a single laser pulse. However, it was found that for larger bore diameters usual for watch jewels this boring method is unsuitable because too high pulse energies are required, with which it is impossible to obtain bores having sufficiently reproducible form and dimensions and with which watch jewels are often split. Consequently too high numbers of waste were obtained for an industrial application of the method, and since relatively high energies per pulse were required when boring with single pulses, the initial costs and maintenance costs of the flash tube, laser crystal and power supply unit are high.

Extensive experiments have now shown, that production of reproducible bores without damaging the workpieces, particularly watch jewels is feasible when according to this invention each bore is worked by means of a number of succeeding laser pulses of which the foci are spaced relatively to each other transversely to the bore axis. The use of a number of pulses of lower energy allows easier control of working of the material and at the same time reduced thermomechanical stresses in the material, the result of this method being that bores of the desired dimensions may be produced practically without waste, particularly in watch jewels.

With the prior method mentioned above it is extremely difficult to so adjust the focus of the laser and other conditions that bores of the desired diameter are bored. With the method according to this invention it is much easier to accurately predetermine the diameter of the bore to be produced by properly adjusting the eccentricity of the foci relatively to the axis of the bore to be produced, of a number of separate laser pulses applied in circular distribution round the bore axis.

With the prior application of a single pulse for working one bore, it is obvious that the axis of incidence of the laser beam coincides with the axis of the bore to be produced. Under these circumstances it is often difficult to produce at least approximately cylindrical bores. With the method according to this invention it is possible to select not only a desired eccentricity, but also a desired angle of incidence of the laser beam relatively to the axis of the bore to be produced. Combination of these conditions often allows production of practically perfect cylindrical bores of any desired diameter.

In connection with the above method wherein a relative displacement between the laser beam and the workpiece is required, certain problems arise with loading the workpieces into a support for the same. An adjustable eccentric arrangement of a rotatable support for workpieces and further an adjustable inclination of this support relatively to the axis of the optical system of the laser would be required. It is another object of this invention to provide a device for carrying out the above method, by which the above difficulties are avoided. This device broadly comprises a laser-focussing system including displaceable optical means allowing shifting of the focus transversely to the optical axis.

Further optical means are preferably provided allowing adjustment of a desired inclination of the direction of incidence of the laser beam relatively to the axis of the bore to be worked. In this way any adjustment and displacement of the workpiece during the boring operation is avoided so that a relatively simple mechanism for loading the workpieces may be provided.

This invention will now be explained in detail with reference to the accompanying drawings illustrating by way of example two embodiments of a device for boring workpieces.

Figure 1:
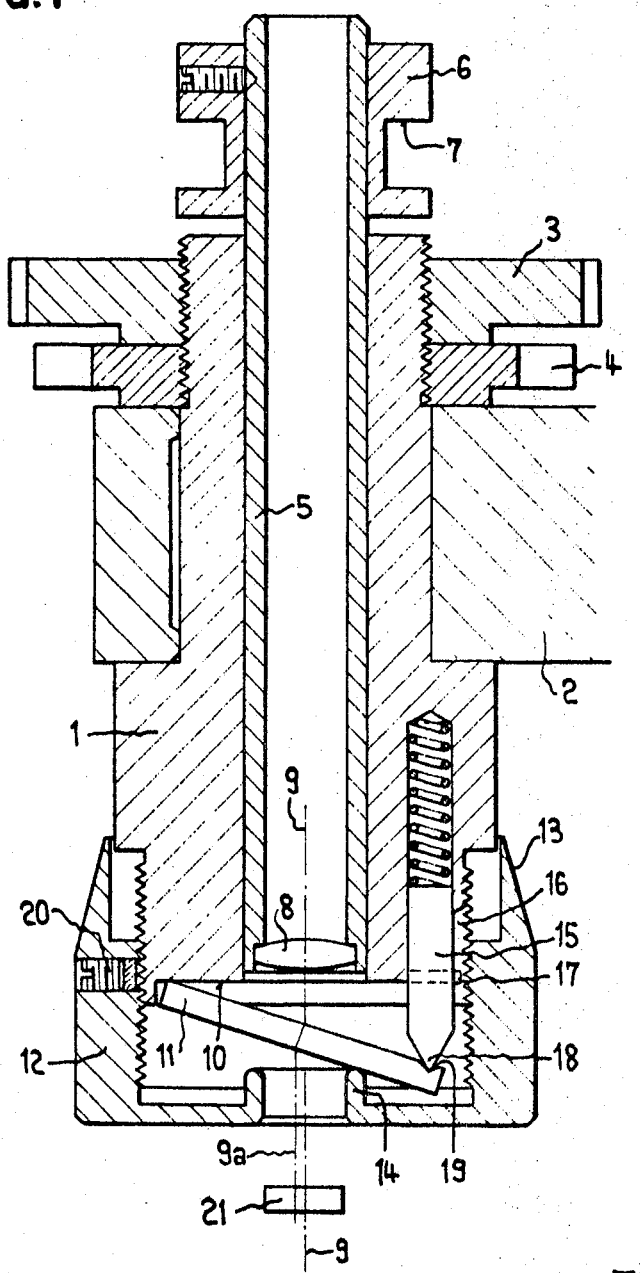
FIG. 1 is a vertical section of the first embodiment.

The device illustrated in FIG. 1 has a tube 1 rotatably mounted in a support 2. A toothed wheel 3 is fixed at the upper end of the tube 1 for driving the same at a relatively low speed by a motor through a gear (not shown) meshing with the wheel 3. As an example, tube 1 is driven at a speed of 1 revolution per second. A cam ring 4 is fixed on tube 1 below wheel 3. An inner tube 5 is axially displaceable within tube 1. A ring 6 having a groove 7 is fixed at the upper end of tube 5. A driver (not shown) for axial displacement of tube 5 engages groove 7. A convex lens 8 of the optical system of the laser is fixed at the lower end of the tube 5. The common axis of tubes 1 and 5 coincides with the axis 9 of the laser beam entering into tube 5 from a laser crystal (not shown) disposed above tubes 1 and 5.

The tube 1 has a shallow cylindrical recess 10 at its lower end. This recess 10 serves for accommodation of a glass disc 11. A cap 12 is screwed to the lower end of the tube 1. A calibrated scale may be provided at the rim 13 of cap 12. Cap 12 has a central collar 14 forming an annular support for disc 11. A spring-loaded rod 15 inserted in a bore of tube 1 and secured against rotation by means of a pin 17 engaging a groove 16 of tube 1 engages with its lower edge 18 a V-groove 19 ground into disc 11, whereby disc 11 is secured against rotation and displacement transversely to rod 15. Due to the spring force transmitted by rod 15 to the one side of disc 11, the latter is maintained in an inclined position in engagement with the bottom of recess 10 and the upper rim of support 14. Cap 12 may be locked on tube 1 in any desired angular position by means of a screw 20. Below the opening of cap 12, the workpiece, 21, for instance a watch jewel is fixed in a support (not shown). For the sake of clear illustration this workpiece is shown at a larger scale than the mechanical and optical parts of the device.

Operation of the device is as follows:

With the workpiece 21 fixed in the position as illustrated, the tube 1 is driven through wheel 3 at the low speed mentioned above and executes a full revolution. During this revolution the cam ring 4 operates a switch or feeler by which a number of laser pulses corresponding to the number of operative cams are released. A coil having a permanent magnet as a core may be provided as a feeler, wherein the magnetic field is influenced by the passage of the cams of ring 4. The laser beam entering through tube 5 along axis 9 is laterally shifted below the lens 8 by the inclined disc 11 as indicated and enters into the workpiece 21 along an axis 9a slightly eccentric relatively to the axis 9. When the tube 1 with disc 11 is rotated the laser pulses released by the cam ring 4 enter into the workpiece with an eccentricity equal to the distance of axes 9 and 9a, and the axis 9a executes a rotating movement round the axis 9 and the axis of the workpiece 21 respectively. Thus, the laser pulses act in places distributed along a circular path round the axis 9, whereby uniform working of the material of the workpiece 21 by means of a number of relatively weak laser pulses occurs. For boring watch jewels pulse energies in the order of 0.1 to 0.8 Joule are sufficient. The number of pulses required may be selected in accordance with the diameter of the bore to be produced, but 3 to 10 pulses should generally be used. The number of pulses may be selected either by exchange of the cam ring 4, or several cam rings may be mounted on the tube 1 and the control switch or feeler may be shifted into the operative range of the cam ring having a number of cams equal to the desired number of pulses. The bore diameter is predetermined by adjustment of the eccentricity of the axis of incidence 9a relatively to axis 9. This adjustment is obtained by adjustment of the inclination of disc 11. To this end the locking screw 20 is loosened and the screwed cap 12 is turned and axially displaced on tube 1. In spite of the friction between collar 14 and the disc 11 occuring thereby, the disc 11 cannot be rotated in tube 1 because it is locked by its engagement in the recess 10 and also by engagement of the edge 18 of rod 15 in the groove 19. By rod 15 the disc 11 is also secured against displacement transversely to the axis 9 so that it will always be possible for disc 11 to fully enter into the recess 10 when the cap 12 is screwed to its uppermost position. In this way the inclination of disc 11 and consequently the eccentricity of the axis of incidence 9a may continuously be adjusted between 0 and a maximum for working bores of different diameter.

For adjustment of the device or during the boring operation, the tube 5 with lens 8 may axially be shifted by means of a driver engaging groove 7, in order to adjust the focus of the laser beam to a proper position relatively to the workpiece 21. Adjustment of the focus in axial direction during the boring operation may preferably be effected in the direction of progress of the bore when bores of substantial axial length are to be produced. Automatic control of such an adjusting movement during the boring operation may be effected by a cam disc.

Figure 3:
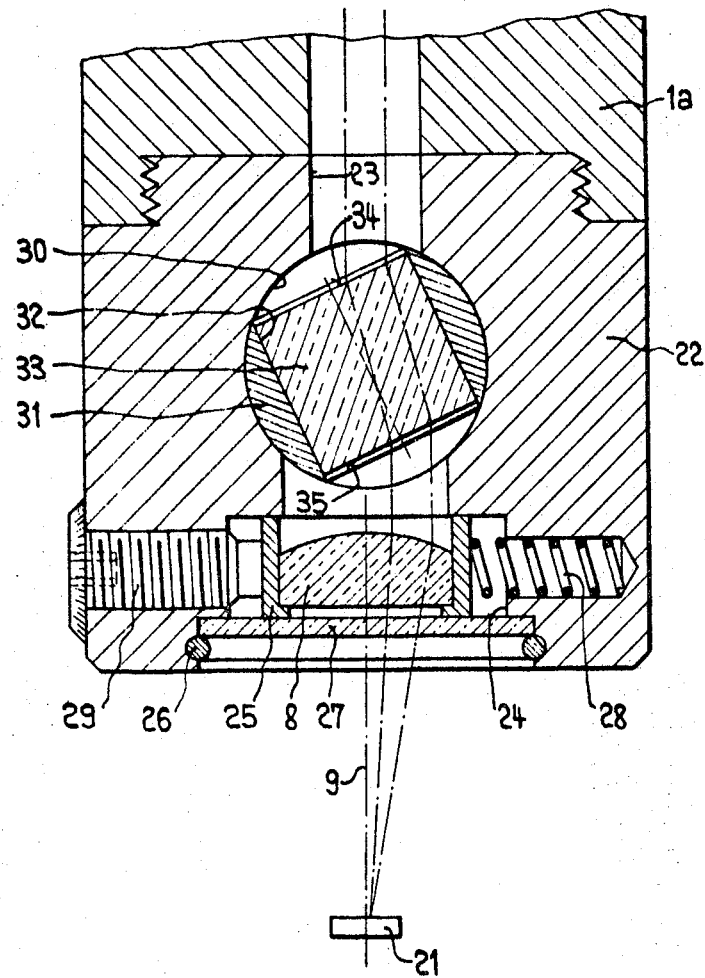
FIG. 3 is a vertical section of the second embodiment.

FIG. 3 illustrates an embodiment of the boring device allowing adjustment of the lateral eccentricity and of the inclination of the axis of incidence of the laser beam. This embodiment has a tube 1a. This tube 1a may be rotated and adjusted in axial direction by means similar to those shown for tube 1 in FIG. 1. Further, a cam ring similar to the cam ring shown in FIG. 1 may be mounted on tube 1a. These parts corresponding to parts 4 and 6 in FIG. 1 are not shown in FIG. 3. A head 22 with a central bore 23 is screwed to the lower end of tube 1a. The lens 8 and its frame 25 are accommodated in a portion 24 of bore 23. The frame 25 is secured and guided for adjustment transversely to the axis 9 between a protecting window 27 of sapphire and a shoulder at the inner end of bore portion 24. The protecting window 25 is fixed by means of a spring ring 26. A pressure spring 28 urges the frame 25 against a regulating or adjusting screw 29 so that the position of frame 25 and lens 8 may be adjusted in a direction transversely to the axis 9 by means of the adjusting screw 29. A similar adjusting assembly consisting of a spring 28 and an adjusting screw 29 is accommodated in another transversal bore disposed perpendicularly to screw 29 and spring 28. The lens 8 may thus be accurately adjusted in two perpendicular coordinate directions.

A mounting 31 is pivotably mounted in a transversal bore 30 of head 22 above the lens 8. A refractive body 33 having plane parallel refractive surfaces 34 and 35 is inserted into a bore 32 of mounting 31. By turning the mounting 31 the body 33 with its refractive surfaces 34 and 35 may be adjusted into a vertical position or inclined position as illustrated. When surfaces 34 and 35 are in inclined position the laser beam emerging from tube 1a into the bore 23 is shifted transversely relatively to axis 9 as indicated and enters eccentrically into the lens 8 which is in coaxial position relatively to the axis 9. In this case the laser beam remains asymmetric at one side of the axis 9 and enters into the workpiece 21 at the side of axis 9.

The device illustrated in FIG. 3 allows adjustment not only of the eccentricity but also of the inclination of the axis of incidence of the laser beam. This combined inclination and asymmetry has not only a favourable influence on the quality and form of the bore to be worked but may also be particularly useful when the workpiece has a central part which should not be hit by the laser beam. It was found to be favourable to locate the intersecting point of the incident laser beam with the axis of the bore to be produced, in the particular case with the axis 9, nearer to the side of light incidence, that is within the half of the workpiece at the side of light incidence. The angle of incidence is preferably in the order of 3° to 5°.

Due to the adjustability of the refractive body 33 and the lens 8 independently from each other the device illustrated in FIG. 3 offers high versatility in the adjustment of various characteristics of the incident laser beam. The eccentricity of the axis of light incidence into the workpiece may not only be adjusted by angular adjustment of the refractive body 33 but additionally or independently therefrom by adjustment of the lens 8 transversely to the axis 9. As an example, when the lenses were shifted to the right until its axis coincides with the axis of the laser beam, the focus would be shifted to the right and the light beam below the lens would be a straight cone. Therefore, it would be possible in particular cases to provide a refractive body 33 having a fixed inclination, whereby the eccentricity of light incidence into the workpiece would be adjusted exclusively by displacement of lens 8.

Instead of providing two systems acting in perpendicular directions for fine adjustment of the frame 25 and lens 8 respectively, the lens may be guided in a straight guide of high precision in which case one spring 28 and one screw 29 are sufficient.

Although it has been mentioned above that a system including a rotatable optical system and a fixed clamping device for the workpiece is preferable when the workpieces are automatically loaded, a fixed optical system and a rotatable and adjustable clamping system for the workpiece may be used under particular circumstances, for instance when manual loading of precious workpieces such as diamond or their jewels is provided.

Figure 2:
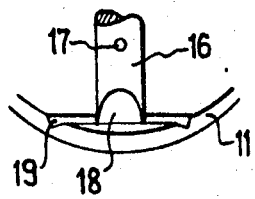
FIG. 2 illustrates a detail of the device according to FIG. 1 in side view.

In the above description of the embodiments it is assumed that the required number of laser pulses act onto the workpiece during one revolution of the optical system in regular, circular distribution round the axis of the bore to be bored. However, for obtaining a bore of particularly high quality and good shape and in order to fully utilize the applied laser energy it may be a substantial advantage to act onto the workpiece by means of two or more pulse series released each during one revolution of the optical system. As an example, four pulses spaced from each other by 90° may be released during a first revolution and a second series of four pulses spaced each by 45° relatively to the pulses of the first series may be released during a second revolution of the optical system. Practical control of the pulses may be obtained in a system as shown in FIGS. 1 or 2 by providing a cam ring 4 having a number N of teeth and by division of the N pulses thus produced during one revolution by means of a frequency divider of the ratio $n$, whereby N is not divisible by $n$. As an example, when 9 teeth are provided and each second pulse is transmitted by a frequency divider having a ratio of 2 for release of a laser pulse, the even pulses will be effective for releasing the laser during the first revolution while the odd pulses are effective during the second revolution of the optical system.

I claim:

1. A method for boring bores of substantially circular cross section into workpieces, particularly watch jewels, by means of laser energy, whereby the workpiece is located in or near the focus of the laser system and the laser pulses are released, each bore being worked by means of a number of succeeding laser pulses of which the foci are spaced relatively to each other around the bore axis.

2. A method according to claim 1, wherein the foci of the laser pulses are concentrically distributed along a circle round the bore axis.

3. A method according to claim 2, wherein the foci of the pulses are regularly spaced from each other and symmetrically distributed round the bore axis.

4. A method according to claim 1, for boring watch jewels, wherein 3 to 10 pulses are applied for working each bore.

5. A method according to claim 1, wherein each bore is worked by laser pulses of different energy.

6. A method according to claim 5, wherein the energy of succeeding pulses is increased at least during a first phase of the boring operation.

7. A method according to claim 1, wherein the axis of the laser beam entering into the workpiece is inclined relatively to the axis of the bore to be produced.

8. A method according to claim 7, wherein the intersecting point of the axis of the laser beam with the axis of the bore to be produced is spaced from the center of the workpiece towards the side of the light incidence and may be located at least approximately in the surface of the workpiece at the side of light incidence.

9. A method according to claim 1, wherein the foci of succeeding laser pulses are also shifted relatively to each other in the direction of the bore axis.

10. A device for producing bores of substantially circular cross section in workpieces, particularly in watch jewels, comprising a laser source adapted for producing laser beam pulses along an optical axis, laser focusing means for focusing said laser beam pulses, means for mounting said workpiece in the focal plane of said focusing means and displaceable optical means allowing shifting of the focus of succeeding laser pulses around the axis of a bore to be produced.

11. A device according to claim 10, comprising a rotatably mounted focusing means and an optical refractive body with plane parallel surfaces.

12. A device according to claim 11, wherein the inclination of the refractive body is adjustable, 13. A device according to claim 11, wherein the body is located between the convex lens and a workpiece support.

14 A device for producing bores in workpieces by means of laser energy comprising a laser source, laser focusing means and rotatable laser deflecting means including a refractive disc having plane parallel surfaces and loosely and displaceably inserted between a radial rest surface an an axially adjustable screwed cap, the foci of succeeding laser pulses being distributed round an axis of the bore to be produced by said rotatable disc.

15. A device according to claim 14, comprising an annular support in the center of said screwed cap and spring means acting against a portion of the rim of the disc, the disc being thereby maintained by spring action in an inclined position determined by abutment of the disc against said rest surface and said annular support.

16. A device according to claim 14, wherein said rest surface has a shallow recess for receiving said disc practically without clearance.

17. A device according to claim 16, wherein said disc and recess are of circular form.

18. A device according to claim 14, wherein said disc is secured against rotation round the axis of the optical system.

19. A device according to claim 15, comprising a spring-loaded pin having an edge engaging a V-groove of the disc.

20. A device according to claim 10, wherein the focusing means are mounted for axial displacement and rotation.

21. A device according to claim 20, comprising a control disc coupled with the focusing means and operable for releasing pulses in accordance with the angular position of the focusing system.

22. A device according to claim 10, comprising optical means adapted for adjustment of the inclination of the axis of the laser beam emerging from the optical system relatively to the axis of light incidence into the optical system.

23. A device according to claim 22, comprising a refractive body for lateral shifting of the laser beam between the laser generator and the focusing system.

24. A device according to claim 22, comprising a focusing lens adjustable transversely to the optical axis.

25. A method according to claim 1, characterized in that a series of pulses is released during each of two or more succeeding operating periods, the foci of the pulses of each series being spaced from the foci of the pulses of one or more other series transversely to the bore axis.

26. A method according to claim 25, wherein series of pulses concentrically and regularly distributed round the bore axis are applied, the pulses of each series being circumferentially spaced from the pulses of one or more other series.